United States Patent [19]

Boykin

[11] Patent Number: 4,531,278
[45] Date of Patent: Jul. 30, 1985

[54] METHOD OF FORMING AN INSULATED BODY FOR A VEHICLE

[75] Inventor: Royce B. Boykin, Fremont, N.C.

[73] Assignee: Hackney Brothers Body Company, Inc., Wilson, N.C.

[21] Appl. No.: 449,220

[22] Filed: Dec. 13, 1982

[51] Int. Cl.³ .............................................. B23P 21/00
[52] U.S. Cl. ........................................ 29/469; 52/404; 52/743; 220/3.1; 296/39 A; 296/183; 296/197
[58] Field of Search .............. 296/191, 197, 196, 183, 296/39 A, 31 P; 220/3.1, DIG. 9; 52/404, 64, 743; 29/428, 429, 455 R, 469

[56] References Cited

U.S. PATENT DOCUMENTS

| | | | |
|---|---|---|---|
| 3,003,810 | 10/1961 | Kloote et al. ...................... | 296/31 P |
| 3,272,269 | 9/1966 | Murphy ............................... | 52/64 X |
| 3,335,653 | 8/1967 | Heimann ........................ | 296/31 P X |
| 3,393,920 | 7/1968 | Ehrlich .......................... | 296/39 A X |
| 3,746,388 | 7/1973 | Robinson ....................... | 296/31 P X |
| 3,956,816 | 5/1976 | Short ....................................... | 29/429 |
| 4,134,242 | 1/1979 | Musz et al. ........................ | 52/743 X |
| 4,292,777 | 10/1981 | Story ................................ | 52/743 X |

Primary Examiner—Charlie T. Moon
Attorney, Agent, or Firm—Mills & Coats

[57] ABSTRACT

This invention is an insulated enclosure which is adapted to be mounted on the frame of a truck. The enclosure is of the knock-down type and thus can be inexpensively shipped and yet is readily assemblable for use. The enclosure is light in weight and yet highly efficient relative to insulating qualities.

9 Claims, 8 Drawing Figures

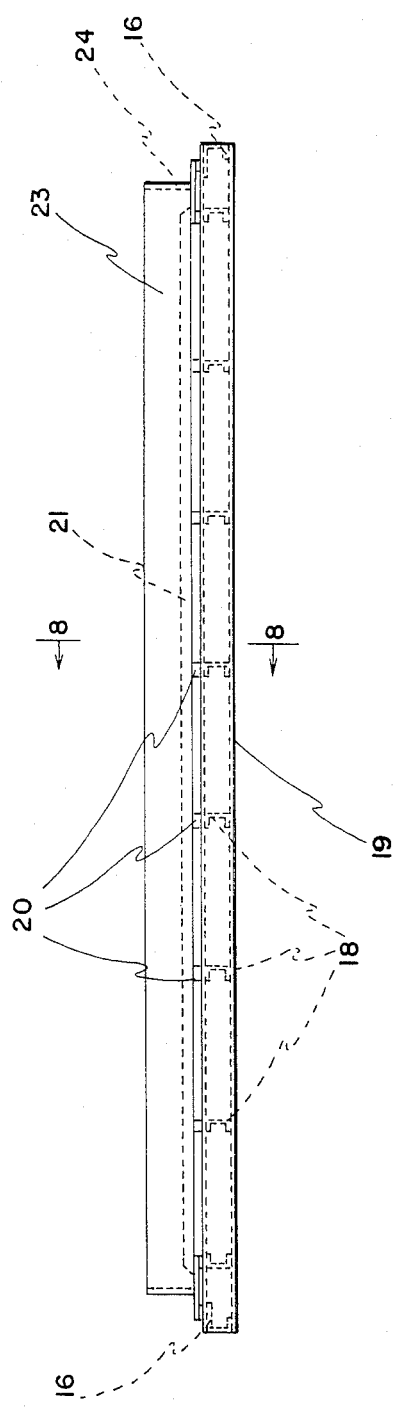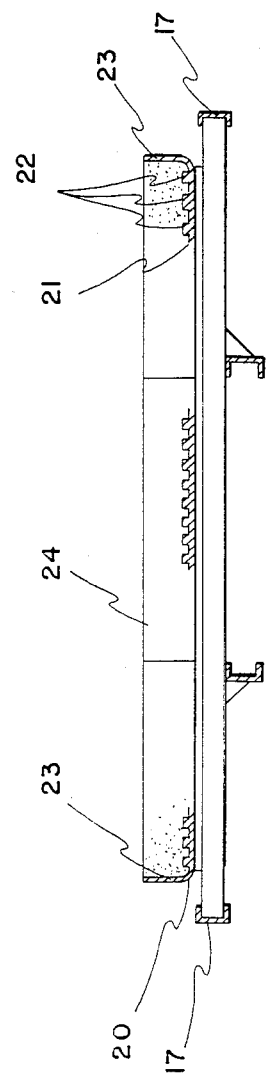

METHOD OF FORMING AN INSULATED BODY FOR A VEHICLE

FIELD OF INVENTION

This invention relates to enclosures and more particularly to insulated enclosures for storage and/or transport of various commodities.

BACKGROUND OF INVENTION

Since man first began the widespread use of refrigeration for preserving foods and similar products, the problem of maintaining the food products in a cool or frozen condition, whether during storage or transport, has been a problem.

Enclosures have been provided which were insulated with various materials in an effort to retain a predetermined interior temperature regardless of ambient temperature. These various insulated enclosures have generally been heavy in weight while at the same time were bulky because of being constructed in final use form.

Knock-down or partially assembled insulated enclosures have heretofore been considered as impractical because they would be too lightweight and heat leakage would occur at the joints thereof which would greatly reduce the efficiency of the unit.

BRIEF DESCRIPTION OF INVENTION

After much research and study into the above-mentioned problems, the present invention has been developed to provide an insulated enclosure which is manufactured and shipped to its use destination in knock-down or disassembled condition and is assembled at the terminal site. Because of the unique assembly method used as well as the joint seal method, an insulated enclosure is provided which matches any factory built enclosure of equal size in efficiency and yet is so designed that it can be used either as a permanent or semi-permanent installation, or can be mounted on a vehicle frame for mobile use.

From the above it is an object of the present invention to provide a highly efficient insulated enclosure which is initially manufactured in disassembled form.

Another object of the present invention is to provide an insulated enclosure for either fixed or mobile use which is self-standing in structure.

Another object of the present invention is to provide an insulated enclosure which can be shipped in knock-down form and yet when assembled provides a highly efficient insulated enclosure.

Another object of the present invention is to provide an insulated enclosure which can be shipped in knock-down form and yet can be assembled in a minimum of time to provide an insulated enclosure equally as efficient as pre-built enclosures.

Another object of the present invention is to provide an insulated enclosure which is light in weight and yet highly efficient in insulating qualities and strong in structural strength.

Other objects and advantages of the present invention will become apparent and obvious from a study of the following description and the accompanying drawings which are merely illustrative of such invention.

BRIEF DESCRIPTION OF FIGURES

FIG. 7 is a side elevational view of the floor assembly of the present invention; and FIG. 8 is a sectional view taken through lines 8—8 of FIG. 7.

DETAILED DESCRIPTION OF INVENTION

Figure 1:
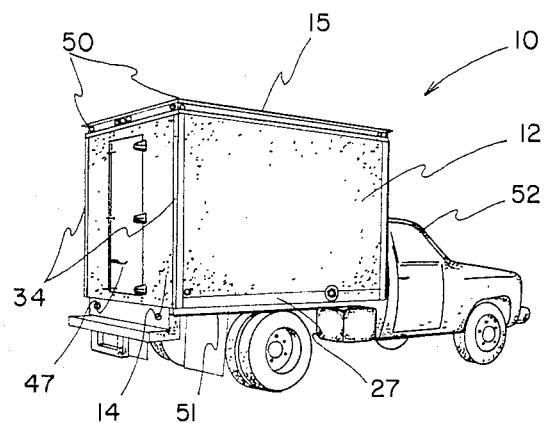
FIG. 1 is a perspective view of the insulated enclosure of the present invention mounted on a vehicle frame.

With further reference to the drawings, the insulated enclosure 10 of the present invention is composed of a floor or bottom assembly 11, identical side assemblies 12, a front assembly 13, a rear assembly 14, and a roof or top assembly 15.

Referring more specifically to the floor assembly shown in detail in FIGS. 7 and 8, end channels 16 and side channels 17 are provided. Intermediate channels 18 extend laterally across the floor assembly in spaced relationship to each other and are covered by an exterior panel 19 preferably of 0.050 inch prepainted aluminum.

Mounted to and above each of the intermediate channels 18 is a floor spacer 20 preferably formed from one-inch wide oak strips. Mounted immediately above the oak strips is a floor 21 preferably formed from extruded aluminum and having a plurality of raised or corrugated portions as indicated at 22. The sides of floor 21 are upwardly configured to form floor flanges 23 as can be seen particularly clear in FIGS. 3 and 8. Extending between the floor flanges 23 across each end of the floor 21 is an end floor flange 24 as can clearly be seen in FIGS. 4 and 7.

The cavities formed between the various channels 16, 17 and 18, the exterior panel 19, and the floor 21 are all filled with insulation 25, preferably of the bulk poured-in-place polyurethane type.

The polyurethane insulation in the floor assembly as well as in the side assemblies, end assemblies, and roof assembly are all preferably at least four inches thick thus giving superior insulating qualities to the completed enclosure.

Intermediate channels similar to channels 18 are provided interiorly of the side assemblies, end assemblies and roof assembly. Since this has been basically shown in the floor assembly, further detailed description of the same is not deemed necessary. Also, in addition to each assembly having an exterior panel 19 of preferably 0.050 inch prepainted aluminum except the roof which is one-piece 0.040 inch aluminum, each also has a corresponding interior panel 26 preferably formed from one-piece 0.040 natural finish aluminum.

Figure 3:
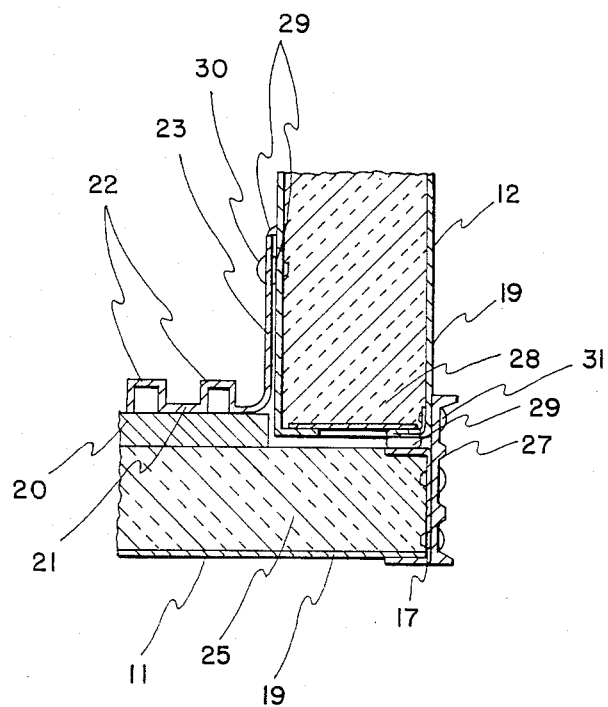
FIG. 3 is a sectional view taken through lines 3—3 of FIG. 2.

A rub rail 27 is secured to the exterior of each of the side channels 17 of the floor assembly 11 thus forming a channel-like groove 28 between such rail and side floor flange 23 as seen particularly clear in FIG. 3.

Side assemblies 12 are adapted to be seated in groove 28 of floor assembly 11 with a substance such as a bead of foster sealer 29 being used to seal the two assemblies. Rivets 30 and 31 are spaced periodically to secure the side channel 17 and rub rail 27, respectively, of floor assembly 11 to the side assembly 12 again as can clearly be seen in FIG. 3.

Figure 4:
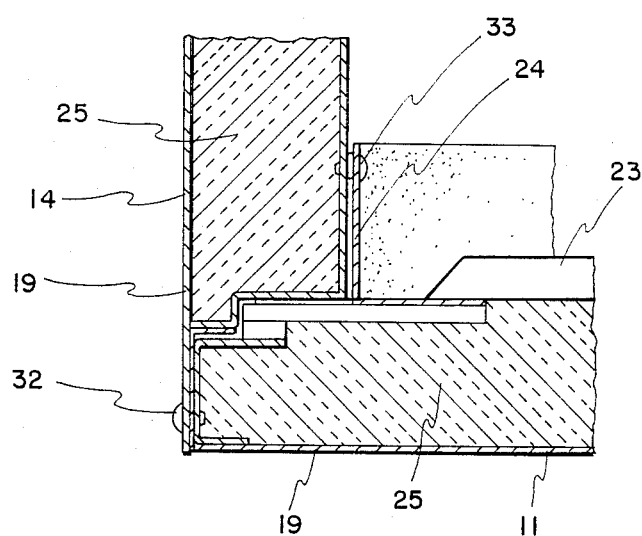
FIG. 4 is a sectional view taken through lines 4—4 of FIG. 2.

The front and rear assemblies 13 and 14 are connected to the floor assembly 15 by placing the same adjacent end floor flanges 24 with a substance such as a bead of foster sealer 29 therebetween to seal the joint. The exterior panels 19 of each of these assemblies lie juxtaposed to the respective end channels 16 of the floor assembly 15 as can be seen particularly clear in FIG. 4. Spaced rivets 32 secure the exterior panels 19 of the end assemblies to end channels 16 and rivets 32 are used to secure end floor flanges 24 to such assemblies again as seen in FIG. 4.

Figure 2:
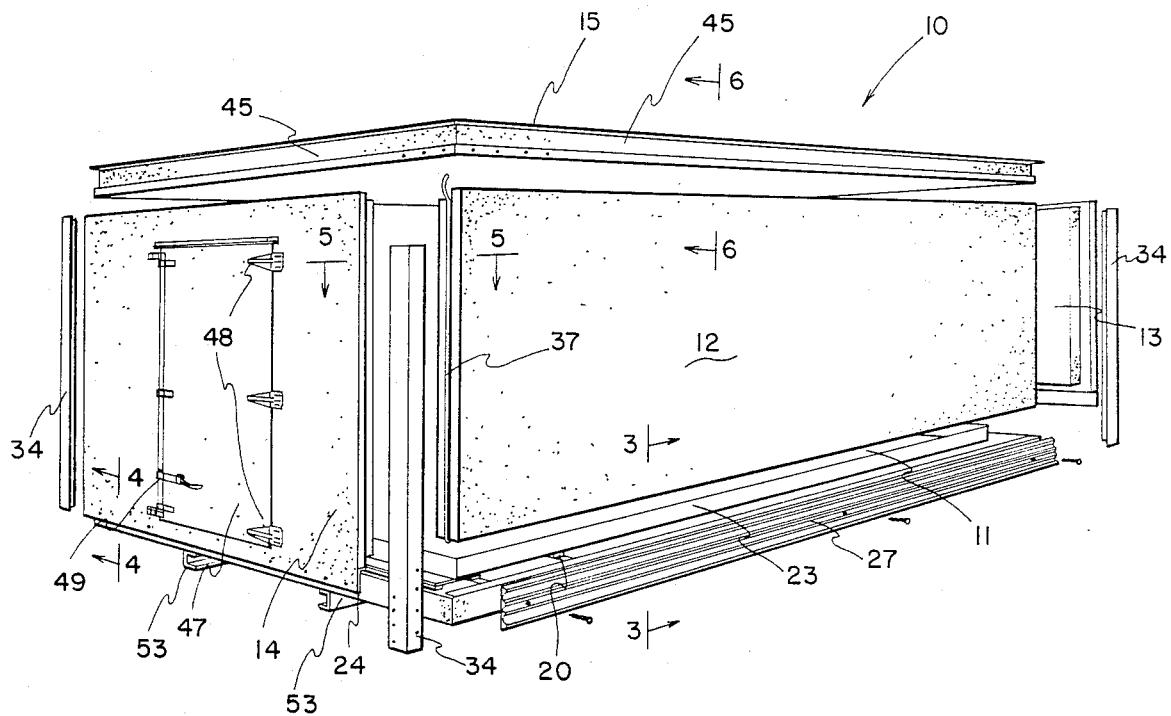
FIG. 2 is an exploded perspective view of the insulated enclosure of the present invention.
Figure 5:
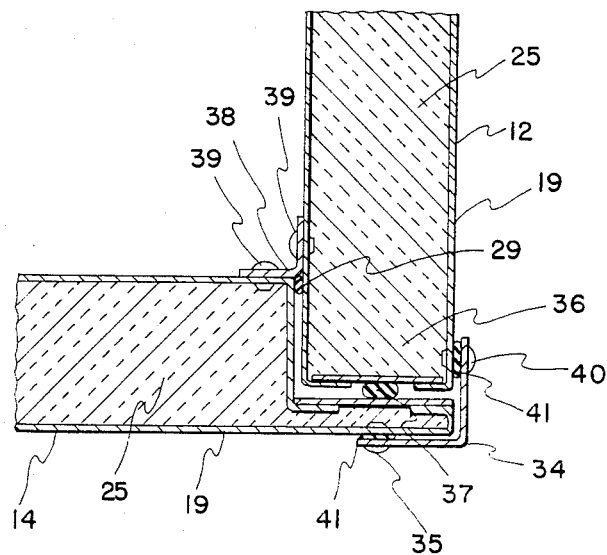
FIG. 5 is a sectional view taken through lines 5—5 of FIG. 2.

Corner covers 34 are secured to the front and rear assemblies 13 and 14 by a plurality of spaced rivets 35 with dip tape being disposed therebetween to form a channel-like groove 36. A sealant tape 37 is provided between the ends of each of the side assemblies 12 and their adjacent front and rear assemblies 13 and 14 as can clearly be seen in FIGS. 2 and 5. Foster sealer is also used between these assemblies as seen clearly in FIG. 5.

Spaced corner angles 38 and their associated rivets 39 are used to secure the interior of the end and side assemblies with rivets 40 being used to secure the corner covers to such sides with dip tape again being used therebetween.

Figure 6:
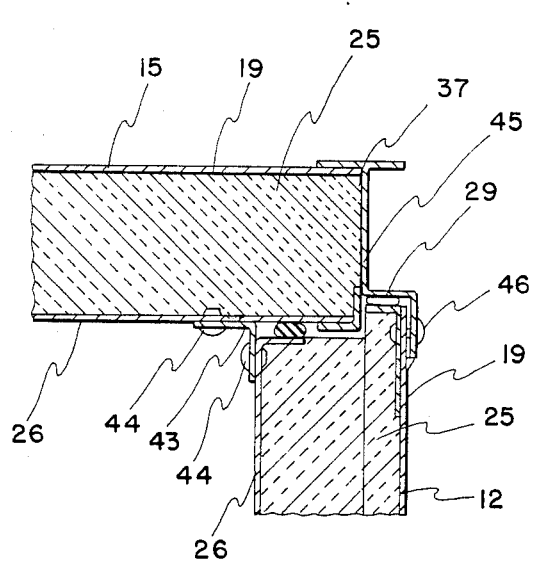
FIG. 6 is a sectional view taken through lines 6—6 of FIG. 2.

Referring specifically to FIG. 6, the roof assembly 15 is attached to the side assemblies 12 and the front and rear assemblies 13 and 14 by placing a sealant tape 42 about the interior perimeter of such side and end assemblies and foster sealer about the outer periphery thereof. The roof assembly is then placed on the inner perimeter and spaced corner angles 43 and their associated rivets 44 are used to secure the same. The extruded perimeter roof rails 45 of roof assembly 15 contact the foster sealer 19 referred to above and is held in place exteriorly relative to the side and end assemblies by rivets 46. Corner caps 50 are used at the juncture of the roof rails 45.

The rear assembly 14 includes an insulated door 47 hung on keil hinges 48 and secured by a polar lock 49. Since insulated doors, keil-type hinges and polar locks are all well known to those skilled in the art, further detailed description of the same is not deemed necessary.

All of the assemblies of the enclosure 10 of the present invention are shipped in knock-down configuration, preferably in a single crate to the consumer.

To put together the enclosure of the present invention, the floor assembly 11 is leveled. Next, sealant is added as hereinabove described, and the side assemblies 12 are secured to such floor assembly. Next the front and rear assemblies 13 and 14 are secured to the floor and side assemblies 11 and 12 with appropriate sealant being used. Finally the roof assembly 15 is secured to the upper edge of the side assemblies 12, front assembly 13 and rear assembly 14 with appropriate sealant being used.

The thus formed insulated enclosure 10 can then be mounted on the frame 51 of a truck type vehicle 52 using support channels 53 of floor assembly 15 in the normal manner. Any electrical wiring for lighting and auxiliary equipment is connected and the enclosure of the present invention is ready for use.

The insulated enclosure of the present invention can obviously be statically mounted as well as mobily mounted as hereinabove described.

From the above it is obvious that the present invention provides a means wherein a unit can be shipped in knock-down configuration to the user thereof and yet when assembled provides a superior insulated enclosure which can be either mobile or statically mounted when in use.

The terms "top", "bottom", "front", "rear", "floor", "roof" have been used herein merely for convenience to describe the insulated enclosure and its parts as oriented in the drawings. It is to be understood, however, that these terms are in no way limiting to the invention since the enclosure may obviously be disposed in different orientations in use.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. The method of forming an insulated frameless body for a vehicle comprising: manufacturing a spaced wall entire vehicle bottom assembly, spaced wall entire vehicle side assemblies, and a spaced wall entire vehicle top assembly; insulating by filling said spaced wall vehicle body bottom, side and top assemblies; shipping said insulated vehicle assemblies in knock-down form from the point of manufacture to an assembly point; and joining said insulated vehicle assemblies to form an insulated enclosure whereby an highly efficient and yet readily shipped means is provided.

2. The method of claim 1 wherein the bottom assembly includes a corrugated floor.

3. The method of claim 2 wherein said corrugated floor is constructed from an aluminum alloy.

4. The method of claim 1 wherein at least one side assembly includes a closure means for allowing access to the interior of said enclosure.

5. The method of claim 4 wherein said closure is an insulated door.

6. The method of claim 1 wherein the material used to insulate said assemblies is bulk poured-in-place polyurethane insulation.

7. The method of claim 6 wherein said insulation is at least four inches thick.

8. The method of claim 1 wherein the joints between said assemblies are sealed.

9. The method of claim 1 wherein said enclosure is mounted on a vehicle frame.

* * * * *